(12) United States Patent
Howes

(10) Patent No.: US 7,571,122 B2
(45) Date of Patent: *Aug. 4, 2009

(54) PAINT MANUFACTURING SYSTEMS

(75) Inventor: John L Howes, Gross Pointe Woods, MI (US)

(73) Assignee: Colors Direct, L.L.C., East Lansing, MI (US)

( * ) Notice: Subject to any disclaimer, the term of this patent is extended or adjusted under 35 U.S.C. 154(b) by 767 days.

This patent is subject to a terminal disclaimer.

(21) Appl. No.: 11/081,143

(22) Filed: Mar. 16, 2005

(65) Prior Publication Data

US 2005/0160077 A1    Jul. 21, 2005

Related U.S. Application Data

(63) Continuation-in-part of application No. 09/543,764, filed on Apr. 5, 2000, now Pat. No. 6,959,284.

(60) Provisional application No. 60/157,840, filed on Oct. 6, 1999.

(51) Int. Cl.
*G06Q 30/00* (2006.01)
(52) U.S. Cl. .......................................... 705/26; 705/37
(58) Field of Classification Search .................... 705/26, 705/37
See application file for complete search history.

(56) References Cited

U.S. PATENT DOCUMENTS

| | | | |
|---|---|---|---|
| 3,851,791 A * | 12/1974 | Flider | .......................... 220/89.4 |
| 4,258,862 A | 3/1981 | Thorsheim | |
| 4,403,866 A | 9/1983 | Falcoff et al. | |
| 4,887,217 A | 12/1989 | Sherman et al. | |
| 4,959,596 A * | 9/1990 | MacMinn et al. | ........ 318/254.2 |
| 4,967,938 A | 11/1990 | Hellenberg | |
| 5,083,591 A | 1/1992 | Edwards et al. | |
| 5,153,825 A | 10/1992 | Yauk et al. | |
| 5,232,126 A * | 8/1993 | Winer | .......................... 222/95 |
| 5,268,849 A | 12/1993 | Howlett et al. | |
| 5,371,599 A | 12/1994 | Falcoff et al. | |
| 5,463,555 A | 10/1995 | Ward et al. | |

(Continued)

FOREIGN PATENT DOCUMENTS

WO    WO 01/59542    8/2001

(Continued)

OTHER PUBLICATIONS

Greenfield, Manufacturers Keeping Pace With Paint Container Market, Modern Paint and Coatings, Feb. 1992, p. 3.*

(Continued)

*Primary Examiner*—James Zurita
(74) *Attorney, Agent, or Firm*—Harness, Dickey & Pierce, P.L.C.

(57) ABSTRACT

A method generally includes electronically receiving an order for a liquid coating over a computer network. The order includes a plurality of inputs relating to a delivery address and a customer-specified color and quantity of liquid coating. The method also includes controllably manufacturing in a single batch and containerizing the customer-specified color and quantity of liquid coating in accordance with the plurality of inputs. The method further includes causing delivery of the customer-specified color and quantity of containerized liquid coating to the delivery address in accordance with the plurality of inputs.

24 Claims, 13 Drawing Sheets

U.S. PATENT DOCUMENTS

| | | | |
|---|---|---|---|
| 5,550,746 | A | 8/1996 | Jacobs |
| 5,559,173 | A | 9/1996 | Campo et al. |
| 5,723,517 | A | 3/1998 | Campo et al. |
| 6,073,055 | A * | 6/2000 | Jahn et al. ................. 700/97 |
| 6,260,730 | B1 | 7/2001 | Fellman |
| 6,358,546 | B1 | 3/2002 | Bebiak et al. |
| 6,484,897 | B1 | 11/2002 | Crawley |
| 6,576,280 | B2 | 6/2003 | Bebiak et al. |
| 6,594,642 | B1 | 7/2003 | Lemchen |
| 7,250,464 | B2 * | 7/2007 | Friel et al. ................. 524/497 |
| 2001/0037255 | A1 | 11/2001 | Tambay et al. |
| 2001/0047250 | A1 | 11/2001 | Schuller et al. |
| 2001/0049591 | A1 | 12/2001 | Brunt et al. |

FOREIGN PATENT DOCUMENTS

| | | |
|---|---|---|
| WO | WO 01/69498 | 9/2001 |

OTHER PUBLICATIONS

Robert Eller, The Plastic Paint Container: Has its time finally come?, Modern Paint and coatings, Oct. 1983.*

Highlights of ITMA: Small-lot capabilities, Isaacs, McAllister III, Rozelle, Walter N, Lennox-Kerr, Peter, Brookstein, David, et al. Textile World. Atlanta: Jan. 1996. vol. 146, Iss. 1; p. 58, downloaded fromProQuest Directon the Internet on May 26, 2009, 32 pages.*

Web Ordering May Alter Role of Distributors, Carol Tice, Jun. 22, 1998, National Home Center News, v 24, n 10, p. 23-25, 5 pages.

Lowe's Launches New Superstore In N.E. Dallas, TX, PR Newswire, Feb. 10, 1998, 3 pages.

Welcome Homes On The Virginia Beach Tour, Visit A Premier Colonial Revival-Style Home, Paintstakingly Built and Restored, Ann Wright, Apr. 19, 1998, 3 pages.

* cited by examiner

PAINT MANUFACTURING SYSTEMS

CROSS-REFERENCE TO RELATED APPLICATIONS

This application is a continuation-in-part of presently allowed application Ser. No. 09/543,764, filed Apr. 5, 2000, which claimed priority to U.S. Provisional Application 60/157,840, filed Oct. 6, 1999.

FIELD

The present invention generally relates to paint and other liquid coating manufacturing systems and methods.

BACKGROUND

Paint and other liquid coatings are usually available in many different colors and quantities. But to obtain a certain color and specific quantity of a liquid coating, the customer must usually travel to a local retailer to select and then purchase the liquid coating.

SUMMARY

According to one aspect of the present invention, a method generally includes electronically receiving an order for a liquid coating over a computer network. The order includes a plurality of inputs relating to a delivery address and a customer-specified color and quantity of liquid coating. The method also includes controllably manufacturing in a single batch and containerizing the customer-specified color and quantity of liquid coating in accordance with the plurality of inputs. The method further includes causing delivery of the customer-specified color and quantity of containerized liquid coating to the delivery address in accordance with the plurality of inputs.

According to another aspect, the present invention includes systems enabling production of customized produced-to-order containerized liquid coatings. In one embodiment, the system includes an electronic interface that is coupled to a computer network. The electronic interface allows a customer to place an order for a liquid coating in a customer-specified color and quantity. The system also includes a customer order subsystem for receiving orders over the computer network. The system further includes a production subsystem for compiling information associated with orders and processing results of the compilation to yield production parameters. In addition, the system includes a production line capable of producing in a single batch a customer-specified color and quantity of liquid coating. The production line is also capable of filling a variable quantity container custom sized to satisfy the customer requirement. The production line is operable in accordance with the production parameters to produce in a single batch the particular volume and color of liquid coating in accordance with orders placed by the customers.

Further aspects and features of the present invention will become apparent from the detailed description provided hereinafter. It should be understood that the detailed description and specific examples, while indicating exemplary embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF EXEMPLARY EMBODIMENTS

Figure 1:
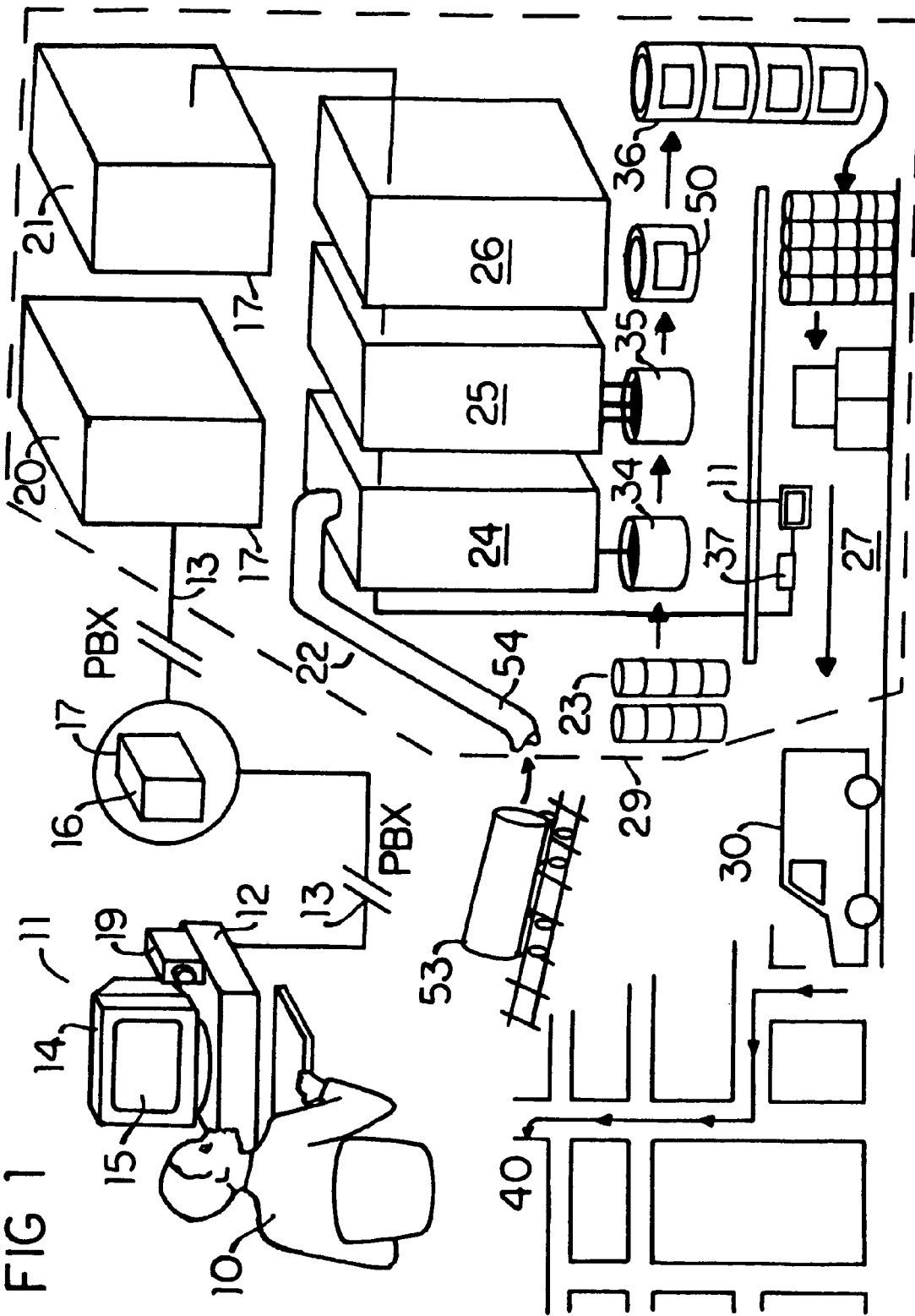
FIG. 1 is a schematic representation of an exemplary liquid coating product supply system according to one exemplary embodiment of the invention utilizing a personal computer connected to the Internet for consumer direct ordering from a remote supplier.

The following description of exemplary embodiments is merely exemplary in nature and is in no way intended to limit the invention, its applications, or uses.

According to one aspect of the present invention, a method generally includes electronically receiving an order for a liquid coating over a computer network. The order includes a plurality of inputs relating to a delivery address and a customer-specified color and quantity of liquid coating. The method also includes controllably manufacturing in a single batch and containerizing the customer-specified color and quantity of liquid coating in accordance with the plurality of inputs. The method further includes causing delivery of the customer-specified color and quantity of containerized liquid coating to the delivery address in accordance with the plurality of inputs.

In some embodiments, the method includes making in a single batch a customer-specified quantity of liquid coating that is a fractional portion or an uneven multiple of gallons, quarts, pints, and liters in any customizable color with the addition of colorant to liquid coating base in precision quantities, and/or fractionally filling a container with a liquid coating base corresponding to the customer-specified color and quantity. In addition, the method can include adding colorant for color customization to a liquid coating base in a precise amount corresponding to the customer-specified color and quantity.

According to another aspect, the present invention includes systems enabling production of customized produced-to-order containerized liquid coatings. In one embodiment, the system includes an electronic interface that is coupled to a computer network. The electronic interface allows a customer to place an order for a liquid coating in a customer-specified color and quantity. The system also includes a customer order subsystem for receiving orders over the computer network. The system further includes a production subsystem for compiling information associated with orders and processing results of the compilation to yield production parameters. In addition, the system includes a production line capable of producing in a single batch a customer-specified color and quantity of liquid coating. The production line is also capable of filling a variable quantity container custom sized to satisfy the customer requirement. The production line is operable in accordance with the production parameters to produce in a single batch the particular volume and color of liquid coating in accordance with orders placed by the customers.

In one particular embodiment, a consumer places an order for liquid coating product directly with a supplier via the Internet or telecommunications. Customer order information is entered into a customer order subsystem on a computer, is compiled, processed and then utilized by a production subsystem governing a production line for containerized liquid coating product inclusive of all colorants required to obtain particular custom colors. Batching with regard to liquid coating base, delivery date and geographic delivery address is suggested. Shipping assemblies and packages specific customer orders for commercial transport service directly to the delivery address given by the consumer. Customer order information including verified content is indicated by a container identifier in assurance of quality. Attachment of a label upon each container after filling with blended liquid coating base and colorant with information printed and/or a bar or other digital code is suggested. Standard containers may be partially filled, and nonstandard (e.g., variable) volume plastic containers may also be utilized in fulfillment of precise order quantities. Product information including digital assistance in selection of base, color, and volume for a given application and placing an order is readily provided on an Internet web site or a dedicated terminal in a kiosk.

Various embodiments can also include adding at least one color-enhancing ingredient to the liquid coating. Exemplary color-enhancing ingredients include glitter, mica, among others.

Various embodiments can also include adding at least one performance-enhancing ingredient to the liquid coating in order to enhance the liquid coating's functional performance, such as anti-skid, anti-friction, conductive, and temperature sensitive, etc.

Accordingly, various embodiments of the invention provide systems and methods that can encompass the entire process by which a liquid coating product can be selected, ordered, and obtained by a customer and how orders so placed may be fulfilled. Exemplary systems and methods include electronic information transfer that is facilitated by Internet utilization and electronic information is processed in the receipt of an order.

As used herein, the term "customer" includes, but is not limited to, consumers, homeowners, decorators, color consultants, general contractors, painters, printers, boat manufacturers, automotive body shops, among other private individuals and commercial concerns that use liquid coatings. By way of example only, the term "customer" can also include one or more industries as defined by the 1987 Standard Industrial Classification (SIC Code), such as Division C, Groups 15, 16, and 17; Division D, Groups 20 through Group 39; Division E, Groups 40 through Group 49; Division F, Groups 50 and 51; Division G, Group 52 through 59; Division H, Group 65; and Division I, Group 70 through 89.

In addition, the term "liquid coating" includes a wide range of liquid coatings including, but not limited to, paint, primers, stains, varnishes, fingernail polish, liquid makeup, lipstick, hair dyes, inks, among others. Such liquid coatings typically include a liquid colorant in addition to a base of appreciable viscosity typically greater than the viscosity of the colorant, although this is not required.

Before describing the exemplary embodiments shown in the figures, additional information recognized by the inventor will be provided in order to facilitate an understanding of the importance and possible advantage(s) which may be realized by embodiments of the invention.

Liquid coatings are ubiquitously contained in rigid cylindrical metal containers, hereinafter referred to as paint cans, possessing large metal lids which require prying off and allow resealing so that colorant may be added by a local retailer and the paint can then be shaken on a machine to attain thorough mixing and fulfillment of the order placed by a customer who typically waits while the addition of colorant and/or mixing of the product is effected. It is important that the colorant be thoroughly mixed with the base, and this usually requires a machine specially designed to mix the contents of paint cans and that typical customers do not have.

The cans in which liquid coatings of this type are available are standardized. Generally only gallons, quarts, and less commonly, pints, are utilized for paint cans in the United States. Five gallon plastic pails are also known for use in containerizing liquid coatings such as paint, stains and varnish as well as more viscous materials such as mastic and other adhesive compounds. These five gallon plastic pails are rigid and generally cylindrical, with a slight sidewall draft angle to facilitate molding, and further possess a large top lid which is resalable.

The unit cost of a liquid coating product usually varies with respect to the standard volume that is purchased. The inventor hereof has recognized that there is a considerable margin of error when the retailer adds the colorant to the base. For this reason, many customers buy a single container of paint in a larger volume than what may actually be needed for a given job in order to have precisely the same color paint for the entire job. For example, a customer may purchase a gallon-sized can of paint instead of purchasing two separate quart-sized cans in order to avoid the possibility that the paint in the separate quart-sized containers might have an appreciably different color, tone, and/or shade.

In addition, the difference in unit price between standard volumes further encourages purchase of a single can or pail of paint of greater volume than required. Three quarts often exceed the price of a gallon of the same paint and this observation by the inventor is taken to indicate a certain set of circumstances relating to the manufacture, distribution, and sales of liquid coatings of this type. The inventor hereof has recognized that there is a certain fixed cost in containerizing and handling a single unit regardless of size which argues for the use of larger containers as being more economic. It is further recognized by the inventor hereof that the manufacturer, distributor, and retailer all have an economic reason for using as few standard volume containers as possible which is compounded by the fact that a local retailer must mix the liquid coating for the customer.

It is also noted that the distribution system for liquid coating product which may have colorant added by a local retailer necessarily involves shipment of product in paint cans or five gallon plastic pails by the manufacturer to the local retailer. A distributor intermediary to the manufacturer and local retailers may additionally be involved. In which case, inventory is carried by three parties prior to purchase by a customer. Most importantly, however, the customer must visit a local retailer in order to purchase the can(s) of paint and typically must wait for the paint to be mixed after colorant is added as discussed above. If the customer is a contractor, this generally entails a visit to the local retailer prior to driving to the work site. The trip to and from the paint retailer, and the time spent waiting while the paint is made up is time lost. The inventor has also recognized that purchasing more paint than necessary for a given job (which is encouraged by the use of standard volumes and the pricing for the same combined with the desire to ensure that all the paint will have the same color, tone, and shade) is even further encouraged by the desire to avoid a second trip back to get more paint if an insufficient amount was picked up the first time. In addition, some manufacturers stock only a limited range of standard-sized containers such the customer must buy a larger container than what is actually needed, which, in turn, increases the cost of a given job.

Accordingly, the inventor hereof has recognized a need for systems and methods that eliminate the need for (and time spent by) a customer to visit a local retailer in order to obtain paint, wherein such visit usually includes ordering the paint, waiting for the addition of colorant and for mixing the paint, and transport of the paint from the retailer. The inventor has also recognized that liquid coating product generally is available only in standard volumes (e.g., gallons, quarts, and pints) and that there are economic and technical reasons encouraging the purchase of a single standard volume of paint exceeding the amount required. Secondly, the inventor has recognized a need for systems and methods capable of economically providing liquid coating product in quantities unrestricted by the use of standard volume containers.

Accordingly, various embodiments of the invention can, but need not necessarily provide one or more of the following exemplary advantages: direct provision of liquid coating product by a supplier remote to consumers thereof which enables a consumer to place an order directly with the remote supplier for liquid coating product inclusive of a plurality of particular custom colors; provision for a remote supplier of particular custom standard colors of liquid coating product to consumers without the addition of colorant to a standard paint by a local retailer; provision by a remote supplier of each of a plurality of a particular custom colors of liquid coating product on different occasions to consumers which will not vary appreciably in color; provision by a remote supplier of liquid coating product to consumers in a continuous range of volume unrestricted by the use of standard volume containers; provision by a remote supplier of liquid coating product to consumers which allows a consumer to select from a visual display of a plurality of particular custom colors of liquid coating product; provision by remote supplier of liquid coating product to consumers which provides product information to a consumer and allows a consumer to input linear dimensions for the area to be covered and receive an output in volumetric units; and/or provision by a remote supplier of liquid coating product to consumers which minimizes (or at least significantly reduces) inventory, is efficient of labor and transport and is hence reliable and economically efficient.

In various embodiments, a system in accordance with the principles relating to the instant invention essentially eliminates the local retailer of liquid coating product by eliminating both the need for a customer to visit a retailer to obtain such product, and the variables introduced by the addition of colorant and mixing of paint by a local retailer. In essence, the system allows the customer to deal directly with a remote supplier of liquid coating product including paint of particular custom colors and to select, order, and obtain the product without having to visit a local retailer. In this regard, the inventor has recognized that the local retailer can't mix variable quantities of paint which is inconsistent with the use of standard quantity containers, such as paint cans. Secondly, the inventor has recognized that computer automated systems for manufacturers facilitative of batch processing and storing detailed information regarding the product are not readily applicable to local retailers for much the same reason that better dispensing apparatus is unsuited to use by a local retailer. Thirdly, it is recognized by the inventor that the local distributor/retailer can't input room dimensions into a computer system to determine the exact quantity of paint required for a given job, and then use that data directly to produce a variable quantity of paint. Accordingly, elimination of the local retailer in the provision of containerized liquid coating product eliminates (or at least reduces) the inventory held by these retailers, which benefit alone provides a more economic system than previously known.

Various embodiments eliminate local retailers of liquid coating product by enabling direct communication between consumer and supplier. This may be accomplished by telecommunications in various ways including telephone, facsimile transmission, and Internet. Using the Internet, however, can provide various additional benefits such as providing information about product including representation of particular custom paint colors. If the consumer knows precisely the product desired, an order may readily be placed using telephone or facsimile transmission. But, in addition to providing information useful in selection of product by the consumer, use of the Internet can also facilitate the placing of an order without need for human assistance.

Voice recognition means for converting a telephonic order into a suitable digital signal for input into a computer or scanning of a facsimile transmissions ostensibly could provide this capability. But either may be more difficult to implement than an Internet-based ordering subsystem. Therefore, various embodiments enable direct communication between consumer and remote supplier for the purpose of selecting the product and placing an order, and this direct communication may be effected with use of conventional telecommunication (e.g., telephone or facsimile transmission), or preferably, with an ordering subsystem that is Internet-based in order to facilitate reception of digital orders by a computer.

In order for a remote supplier to efficiently fulfill direct customer orders, computer control of the production is further considered advantageous. In various embodiments, the supplier possesses the capability of efficiently performing the service conventionally supplied by local retailers, and is able to track large numbers of independent direct customer orders and coordinate the activities required in timely fulfillment of the same. Batch processing may be useful, but the production subsystem is not necessarily concerned with the manufacture of known volumes of standard color paint (though this may be additionally included). Instead, the production subsystem is generally concerned with the production of numerous, diverse, specific quantities of particular custom colors of liquid coating in fulfillment of specific customer orders.

In various embodiments, the production is largely computer automated with every customer order being associated in computer memory with the containers utilized in fulfillment of each order. This may be assisted with the use of labels bearing a barcode, which may be read by a bar code scanner or more simply with a label bearing information identifying the customer order. In one embodiment, the label includes all the customer order information such as customer name, delivery address, order and delivery dates, and the quantity and number of containers of each liquid coating product comprising the order. Rather than relying exclusively upon bar codes and scanners, some embodiments include labels bearing customer order information that are attached to appropriate containers. An indication can also be placed on the label or elsewhere on the container that indicates the precise contents within the container. The indication is placed as a result of the disposition of that contents therein, which provides a quality control assurance superior to that obtainable by a system relying solely upon a bar code label upon the containers.

In various embodiments, delivery of the liquid coating product includes transit of the same from the remote supplier directly to the address specified by the customer. This may, conveniently for the customer, be the work site if ordered by a contractor or the home of the "weekend painter". While there is necessarily time delay for transport, the customer can be given a delivery date at the time of ordering and commercial shipping or transport services (e.g., United Parcel Service, etc.). The delivery date does not necessarily need to be exact, but it is preferably the date by which delivery is promised. Express delivery can be available for an additional charge. Production dates-based upon the anticipated time required of the delivery and the delivery date can be part of the information clearly indicated upon each container utilized for fulfillment of the order.

Rather than relying upon a bar code for tracking production, the product(s) can be grouped by customer order, and batching can reflect time and geography as determined by delivery date and address to facilitate shipping. Batching by type of product base and production date is generally recommended in commencement of production. Inventory of standard color liquid coating product is assumed unless production is inclusive of manufacturing standard product and this production is further integrated with production of particular custom colors.

While inventory can be kept in the form of conventional, consumer size, e.g. gallon paint cans, it is generally recommended that inventory of standard liquid coating product from a manufacturer be maintained in fifty-five gallon barrels or other comparatively containers, such as 1,000 liter "totes" so that dispensing of both the standard product and the colorants required in production of product possessing particular custom colors may be effected by the same production line. In various embodiments, tanks having sufficient capacity to contain the content of a full tanker trailer and/or railroad tank car are connected by pipeline to an appropriate storage vessel and then connected by pipeline to the dispensing machines in the production line. Regardless of the standard liquid coating product (e.g., base) inventory maintained by the producer, it is considered prudent to first batch production by the type of base and the production date.

For various embodiments, it is suggested that production be batched by shipment date and geographic area for delivery, and that containerized product comprising specific orders be grouped together, preferably during or before shipment batching. Batching by base material, delivery, and specific order can all be correlated to time with production, delivery and order dates. In various embodiment, a production subsystem receives information from the ordering subsystem, and the production subsystem is used to govern production in fulfillment of the orders, preferably with the use of a computer and utilizing one or more of the types of batching.

While standard volume containers are of obvious utility to a production process that maintains inventory of standard color liquid coating product, various embodiments can essentially eliminate (or least significantly reduce) both inventory of, and the need to open, sealed containers in order to add colorant in fulfillment of an order for a particular custom color liquid coating. While requiring flexibility, a production process exclusively responsive to customer orders can enable maximum efficiency as inventory is eliminated (or at least significantly reduced) and every container (or substantially all containers) is run through the production process just once. Given flexibility of the production equipment and computer control of the same with sufficient sophistication to recognize each specific task as dedicated to fulfillment of a particular customer order, nonstandard and/or variable quantity container may readily be utilized.

More specifically, while a set number of standard maximum volume containers may be considered as a practical necessity, it is not necessary that each container be fully filled nor that rigid cylindrical containers possessing a resealable lid be utilized. Standard paint cans of one gallon size might be utilized exclusively in some embodiments, for example, with partial filling of one paint can per order as required to yield the precise volume ordered. And, because it is not necessary to open a sealed container for addition of colorant by a local retailer, other types of containers may be utilized in various embodiments of the invention. Further embodiments utilize flexible expansible plastic or film containers that can be permanently sealed, or sealed with re-closable features such as flange zippers, press-to-close design which are more conducive to the needs of the customer versus conventional paint cans, especially for smaller volumes, and the fact that the content was specifically produced to order emphasized thereby in reassurance to the customer that the order placed has been correctly fulfilled. Product samples comprised of a volume less than a pint are further enabled by various embodiments of the invention.

The ordering subsystem can provide product information to the consumer including representation of particular custom paint colors, base characteristics, and pricing. This information may be available by accessing an Internet web site. Means for placing an order including a method of payment can be provided. Credit accounts of various types are suggested including input of credit card numbers or direct accounts with the supplier. Assistance in selection of order quantity can be provided whereby a customer may input dimensional information regarding the surface area to be covered and an appropriate volume is outputted. Selection may be further assisted with input of type of usage, e.g., interior or exterior, bathroom or kitchen versus other interior surface, et cetera. With appropriate software supporting an Internet web site, the consumer may provide digital input including video, photographic, and solid modeling representations of furnishings within rooms, thereby providing spatial and color inputs which may be utilized to generate one or more suggestions of a particular color for the surfaces intended to be covered.

In various embodiments, an Internet web site for digital input into the ordering subsystem is used to enable direct placement of orders by a consumer with the remote supplier. Other embodiments, however, include a kiosk located terminal either connected to the Internet (e.g., with access limited to the remote supplier's web site) or with a direct line to the remote supplier ordering subsystem. While such kiosk located terminals could be located upon the premises of a local retailer with the consumer visiting the same, the consumer still does not have to rely upon the capabilities of the local retailer in adding colorant and mixing the same with base in achievement of a particular custom color. Plus, the consumer further does not need to transport the liquid coating product so ordered from a local retailer. An Internet-based web site may be designed to facilitate access with interaction by a portable, hand held, Internet device using radio frequency signal transmission and reception with a public broadcast exchange (PBX).

Referring now to the figures, FIG. 1 depicts a consumer 10, which for purposes herein can include any person interested in purchasing containerized liquid coating product. Exemplary liquid coatings include paint, primer, stain, varnish, mastic or other adhesive, fingernail polish, liquid makeup, lipstick, hair dyes, inks, among others, which may require the addition of colorant in order to achieve a particular custom color. Other production configurations are also contemplated. As shown, the consumer 10 is in front of and operating an Internet terminal 11 depicted therein as comprising a desk top type personal computer (PC) 12 possessing a modem line connection 13 to a public telephone exchange (PBX), a monitor 14 possessing visual display screen 15 upon which an interactive web site 16 comprised of software held by a server computer 17 may be viewed after accessing over the Internet. The consumer 10 accesses the web site 16 by inputting an appropriate Internet address such as the domain name, which may first be identified with the use of an Internet search engine, and is able to select and order upon this web site 16 containerized liquid coating product 36 which requires colorant addition to achieve any one of a plurality of particular custom colors which are further represented upon the visual display screen 15.

The web site 16 provides information sufficient to enable both selection and ordering of containerized liquid coating product including that which requires colorant addition to achieve a particular custom color. This information preferably identifies and describes liquid coating base 24 characteristics wherein the base material is a liquid coating product of a standard color which is generally available to local retailers from a manufacturer or distributor intermediary to the two. Liquid coating base 24 characteristics are determined by the use of oil, water, latex, and polymer compositions and are readily described as suited to various exterior and interior applications wherein both the surface and the environment conditions are readily recognized by the inventor hereof as criteria for determining suitability.

Oil-based liquid coating product 36, for example, is generally considered as superior for exterior and severe environment applications while water-based latex liquid coating product 36 is generally preferred for interior applications of less than severe environments. Liquid coating bases 24 are also typically characterized by the resulting dry finish e.g. gloss, semi-gloss, and flat, which are generally associated with composition and the environment suitable. Flat finishes are typically preferred for interior and exterior wall while semi-gloss or gloss is typically preferred for trim. Bathrooms and kitchens are considered to be moderately severe environments for which semi-gloss polymer and oil-based paints are considered suitable for walls. Water-based liquid coating bans 24 are generally less expensive and easier to use than oil-based liquid coating bases 24.

Another aspect important to an average consumer 10 is the appropriate quantity. A can of paint may specify a coverage range in square feet but this may be beyond the comprehension of the novice or less mathematically inclined consumer 10. While area in square feet is simply the product of the two relevant linear dimensions for a rectangular area, and most walls are rectangular, the actual usage is also dependent upon other factors such as the quality of the surface to coated and its current color. A given area of concrete block wall, for example, will require far-more liquid coating product 36 than a drywall surface of the same area.

Alternatively, while the consumer 10 may generally be assumed to desire ordering a sufficient volume of liquid coating product 36 for a given job, the volume left over is generally wasted and comprises an inconvenience in addition to needless expense. This is considered especially relevant if the liquid coating product 36 is of a particular custom color which was selected for a specific application and is considered useless for any other application in the foreseeable future. For all of these reasons it is considered a great benefit to the consumer 10 to be able to accurately determine the volume of liquid coating product 36 appropriate to a given application and assistance in the same which preferably accounts for as many factors as feasible is hence considered beneficial for which reason an Internet-based web site 16 is considered the best means of both providing information about liquid coating product 36 and assisting in the selection of both a particular custom color and a suitable volume (e.g., variable quantity) of the same for a given application.

Figure 3:
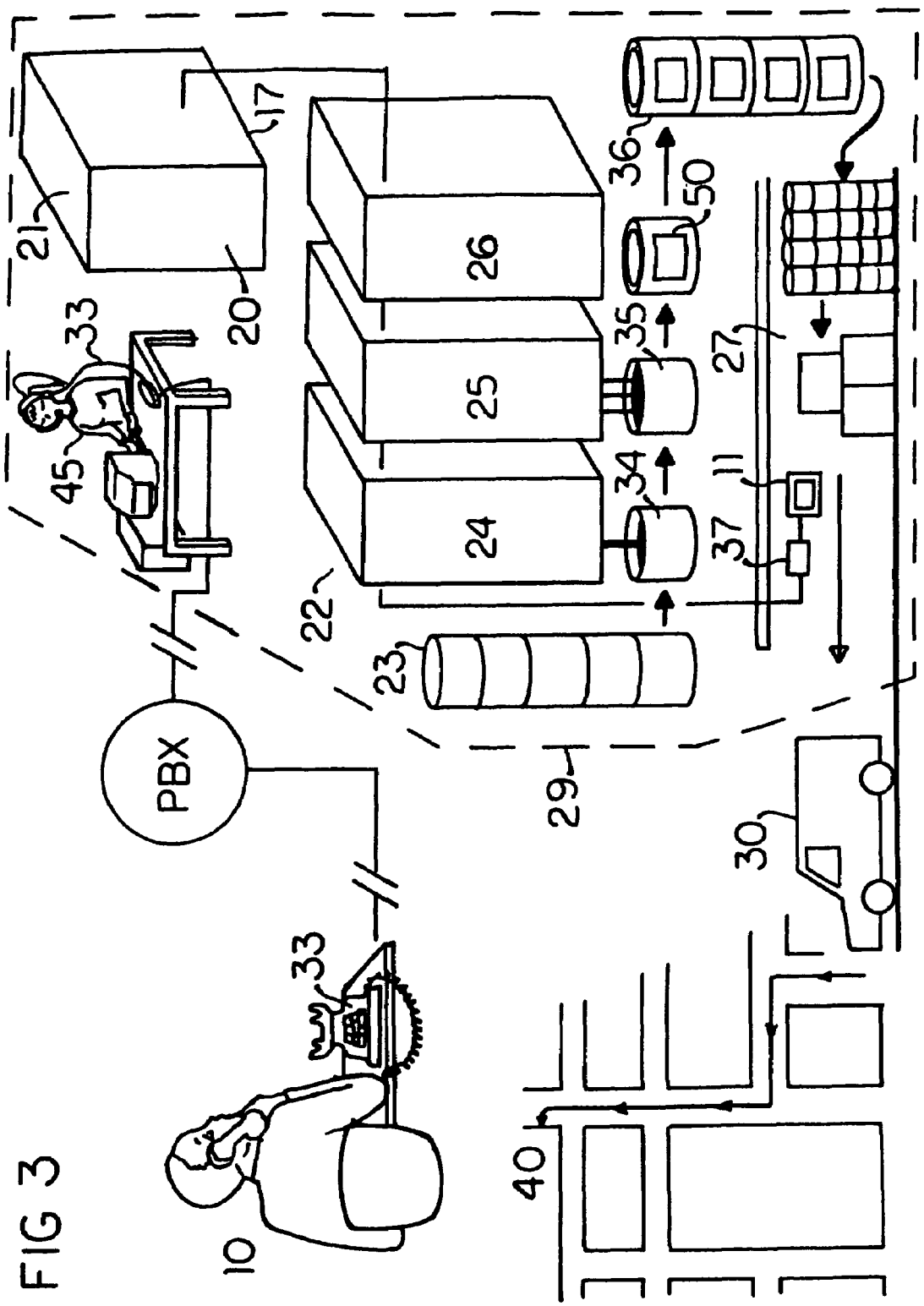
FIG. 3 is a schematic representation of an exemplary liquid coating product supply system according to one exemplary embodiment of the invention utilizing a telephone for consumer direct ordering from a remote supplier.
Figure 4:
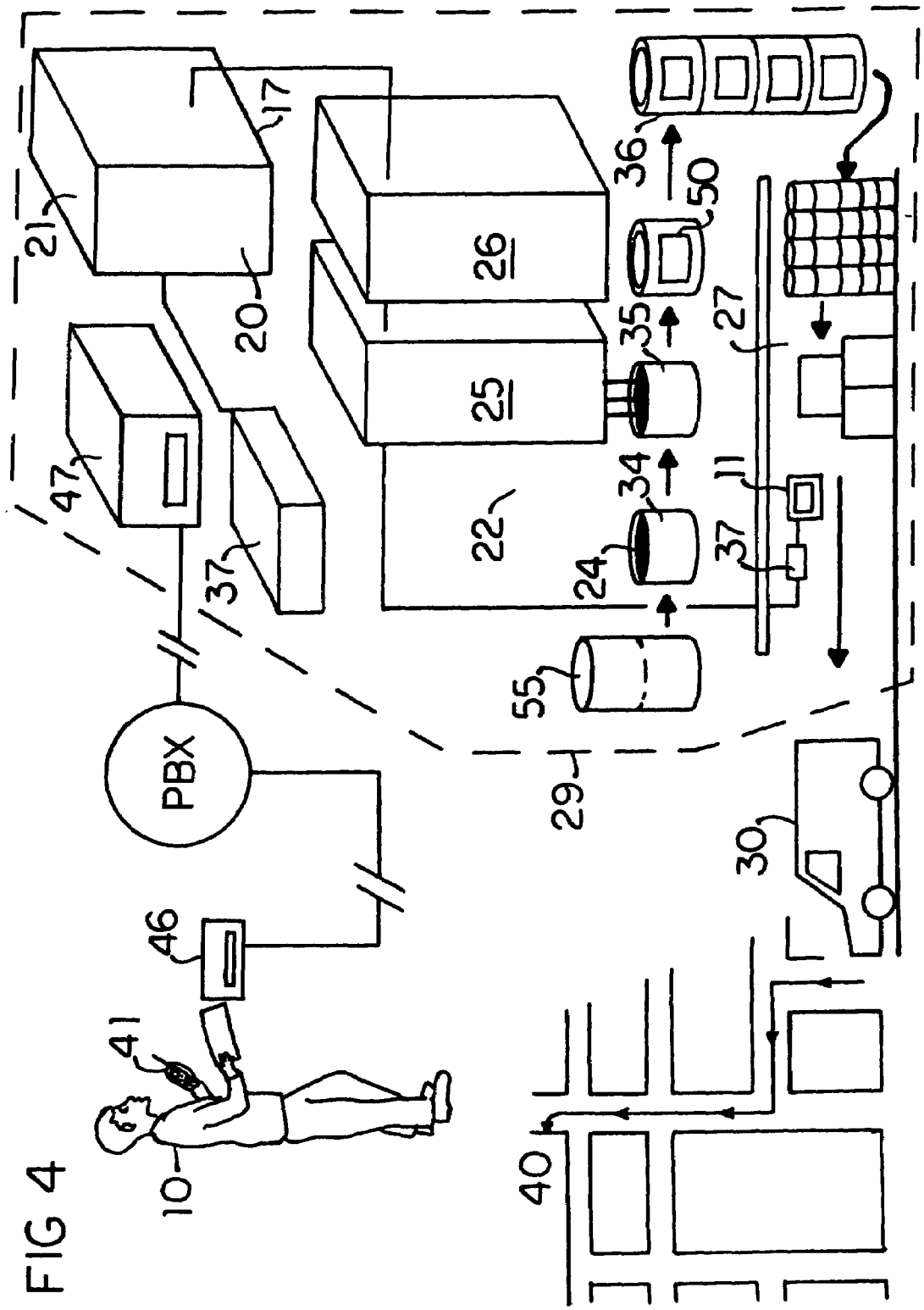
FIG. 4 is a schematic representation of an exemplary liquid coating product supply system according to one exemplary embodiment of the invention utilizing facsimile transmission for consumer direct ordering from a remote supplier.

As another example of the advantages available through use of an Internet-based web site 16 as the means for ordering liquid coating product 36 directly from a supplier, as represented in FIG. 1 and in contrast to a telephonic or facsimile transmission ordering as represented in FIGS. 3 and 4, appropriate software comprising the web site 16 in this case will receive digital input from the consumer 19 and provide information to assist in product selection and may suggest one or more particular custom colors for the liquid coating product 36 for ordering by the consumer 10.

Regardless of the means utilized for selection and ordering of liquid coating product 36, a customer order must identify the quantity of each, a delivery address, and preferably a delivery date. This comprises information which is entered into a customer order subsystem 20 maintained by a supplier which is remote to the consumer 10. Its represented in FIGS. 1 and 2 the customer order subsystem 20 is preferably comprised of software run by a computer 17 possessing an operable Internet modem connection 13 with a PBX. In this case the web site 16 is assumed to be comprised of different software run by a server computer 17 maintained by an Internet service provider which is different that the computer 17 running the software comprising the customer order subsystem 20 though this is not strictly necessary. The two sets of software might be one and the same with the server computer 17 maintaining the web site 16 also maintaining the customer order subsystem 20 or vice versa. In any case, the two sets of software are preferably integrated to a degree which at minimum enables a consumer 10 to place an order and the remote supplier to obtain the information necessary to fulfill that order. The software comprising the web site 16 and the customer order subsystem 20 is effectively the same with this regard but it is also recognized by the inventor hereof that it is undesirable to have direct public access to the computer systems maintained by the supplier and the desirability of one or more firewalls erected against unwanted intrusion argues for the use of different software running on different computers 17 for the web site 16 and the customer order subsystem 20.

Figure 2:
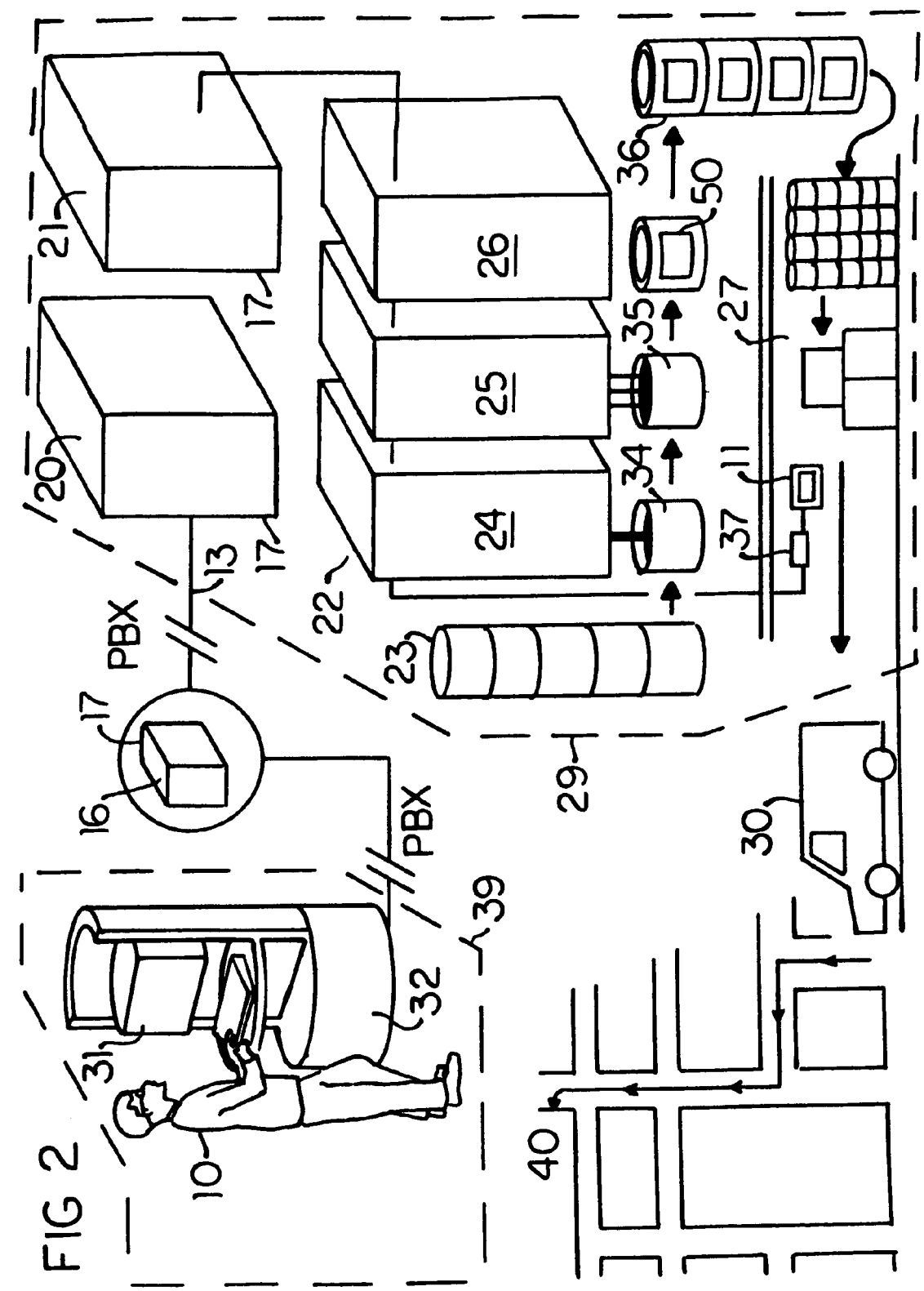
FIG. 2 is a schematic representation of an exemplary preferred liquid coating product supply system according to one exemplary embodiment of the invention utilizing a kiosk terminal connected to the Internet for consumer direct ordering from a remote supplier.

For at least this reason, it is considered desirable to separate a computer-based customer order subsystem 20 from a computer-based production subsystem 21 despite the need for information transfer between the two. The production subsystem 21 ideally governs the production line 22 in order to achieve automation and flexibility in the same. Input data comprising appropriate customer order information 51 are preferably utilized in two coordinated ways with regard to the production line 22. It is suggested that the order data be compiled and processed into parameters governing production in achievement of batching with respect to the use of liquid coating base 24 which is preferably disposed into empty containers 23, as depicted in FIGS. 2 and 3 and implied in FIG. 4.

Figure 12:
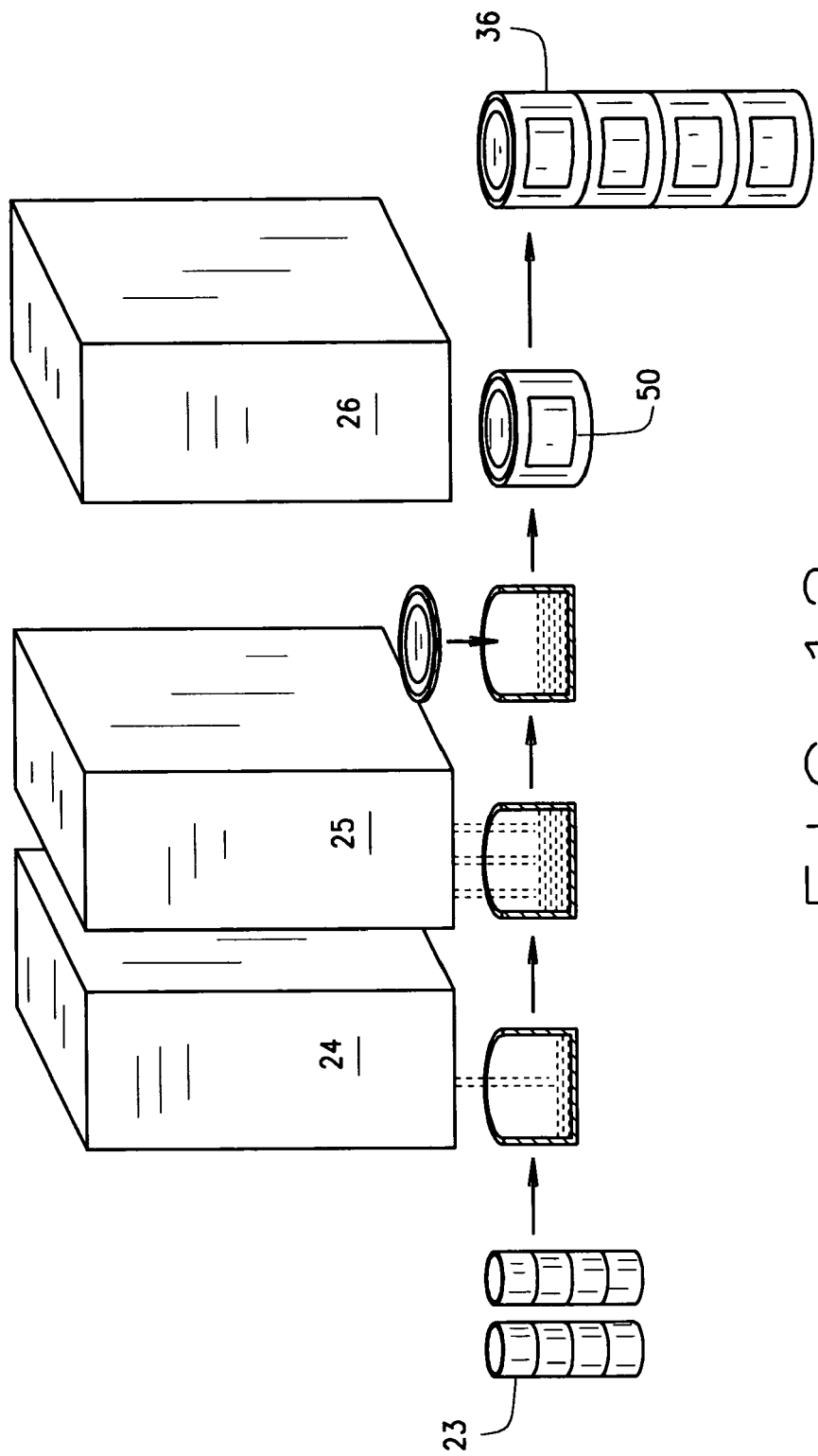
FIG. 12 is a schematic representation of an exemplary liquid coating product supply system according to one exemplary embodiment of the invention and illustrating containers being partially filled with liquid coating.

In various embodiments, the containers 23 can be industry-standard sized containers (e.g., five-gallon containers, one-gallon containers, one-quart containers, one-pint containers, etc.) that are partially filled (FIG. 12) or completely filled with liquid coating depending on the amount requested by the customer. In other embodiments, the container 23 can be variable quantity film containers (e.g., plastic bag, etc.) with a re-closable feature such as a flange zipper. In such embodiments, the variable quantity film container can be partially filled or completely filled with liquid coating (depending on the customer order), the re-closable feature can be closed, and the variable quantity film container can be placed in a can or other support container. In further embodiments, the variable quantity containers are semi-rigid plastic bags which possess sufficient rigidity such that they do not need to be placed in a separate can or other container. Still yet other embodiments use one or more of the containers described in U.S. Pat. No. 6,484,897 entitled "Containers with Variable Volumes"; U.S. Pat. No. 6,260,730 entitled "Painting System with Interchangeable Liner for Paint", and/or U.S. Pat. No. 4,258,862 entitled "Liquid Dispenser". Yet another exemplary embodiment includes variable volume/quantity containers that are similar in construction to a caulk tube and compatible for use with a piston-type caulking gun. Alternatively, other types of containers can be used as aspects of this invention are not limited to any particular type or kind of container. Accordingly, various embodiments of the present invention enable liquid coatings to be produced and delivered to ultimate consumers/end users in customized produced-to-order quantities over a range of volumes unrestricted by the use of industry-standard sized containers such as five-gallon containers, one-gallon containers, one-quart containers, and one-pint containers. Advantageously, this can enable a consumer to obtain a quantity of liquid coating that has been simultaneously produced as a single batch even for quantities exceeding industry-standard quantities. As a result of being produced in a single batch, the liquid coating that the customer obtains may have a more uniform color consistency as compared to two or more separately mixed batches of liquid coating.

Batching is also recommended for the addition of colorant 25 in achievement of particular custom colors and it is specifically suggested that customer order information 51 be transferred, in coordination with batching, onto each open container with colorant 35, in identification of the content therein preferably including the customer name, delivery address, delivery date, and volume (e.g., variable quantity) of each liquid coating product 36 and the number of containers utilized in fulfillment of each order.

As shown in FIGS. 1 through 4, the containerized liquid coating product 36, preferably carrying a label 50 with the customer order information 51 detailed above clearly printed thereon and or a bar or other digital code 52 by which such information may be readily retrieved by a scanner 37, is transferred from the end of the production line 22 to shipping 27 from which it is then taken by suitable transport 30 to the location identified by the customer delivery address 40. Shipping 27, represented simply as an area within the confines of the remote supplier 29, preferably comprises an area in which orders are assembled and packaged for delivery 'pick-up' by a commercial transport 30 service and wherein batching by order and delivery date is preferably observed. For this purpose and for effecting a change in status, both in receipt from the production line 22 and in shipment of the order, in the production subsystem 21 shipping 27 preferably possesses a computer monitor 14 with a direct line-connection to the computer 17 in which the production subsystem 21 is maintained and operated.

With regard to the various embodiments shown in FIGS. 1 through 4, FIG. 1 illustrates the consumer 10 utilizing an Internet terminal 11 comprised of a PC 12 with a modem connection 13 and associated computer monitor 14. In FIG. 2, however, the consumer 10 is shown using a dedicated terminal 31 located at a kiosk 32 which is preferably located within the confines of a local retailer 39. The dedicated terminal 31 is preferably wired so that only the web site 16 maintained in representation of the remote supplier is accessible. In this case, there is hence effectively no Internet and the functioning of the single accessible web site 16 maintained on a Internet server computer 17 may effectively be assumed by the computer 17 also maintaining the customer order subsystem 20 within the confines of the remote supplier 29. As represented in FIG. 3 the consumer 10 uses a telephone 33 to place an order with supplier personnel 45. FIG. 4 shows the consumer 10 placing an order by facsimile transmission 46. The order is received by the remote supplier with facsimile reception 47. In the left hand of the consumer 10, there is shown a portable Internet device 41, which may also be utilized for the placement of an order via a web site 16 such as that shown in FIGS. 1 and 2.

The production line 22 of the illustrated embodiments in FIGS. 1 through 4 also vary and the varying components. As represented in FIG. 4, open containers 34 filled with liquid coating base material 24 obtained directly from a manufacturer may be utilized though it is preferred that more economic volumes such as a fifty-five gallon drum 55 or 1,000 liter 'tote' be obtained from a manufacturer in which case empty containers 23, represented in the other figures, of suitable size for customer order fulfillment will also be required.

In FIG. 1, railroad tank car 53 is represented from which liquid coating base 24 is transferred via a pipe line 54 into a tank in the production line 22 for dispensing into empty containers 23. In FIGS. 2 and 3 empty containers 23 are similarly filled with liquid coating base 24 by the first dispensing unit in the production line 22 which in all cases proceeds with the dispensing of colorant 25 into an open container 34 with liquid coating base 24 thus achieving an open container with colorant 35. The use of a dedicated terminal 31 located in a kiosk 32 within the confines of a local retailer 39 is considered appropriate for a remote supplier which is also a manufacturer and the step of filling empty containers 23 with liquid coating base material may in this case more specifically comprise the addition of constituents of the liquid coating base 24 including solvent, polymers, and binder from tanks holding each constituent separately.

With respect to various embodiments as represented in FIGS. 1 through 4, the opening and closing of the containers 23 as well as the blending of the contents therein resulting in the containerized liquid coating product 36 is assumed in each production line 22. It is generally preferred that closure of the open containers with colorant 35 after the addition of any colorant 25 to the open container 34 filled with liquid coming base 24 be coordinated with the operation of a container identifier 26 which is represented as the addition of a label 50 upon the open container with colorant 35. It is further preferred that the container identifier 26 be controlled in coordination with control of the addition of the colorant 25 and the liquid coating base 24 by the production subsystem 21 as indicated by the direct lines between these but that the feedback data from the filling operations be utilized to ensure that the container identifier 26 operates accurately.

As further represented in FIG. 4, the consumer 10 is placing an order by facsimile transmission 46 through a PBX and the order is taken by facsimile reception 47 and converted into digital format with the use of a scanner 37 which also enters the order including customer order information 51 into a single computer 17 operating both the software comprising the customer order subsystem 20 and the software comprising the production subsystem 21. This is also the case represented in FIG. 3. In both cases entrance of customer order information 51 into the customer order subsystem 20 is preferably performed with the aid of supplier personnel 45 as represented in FIG. 3. While in various aspects it may be considered inferior to use of the Internet through a web site 16 maintained on an Internet server computer 17 as described above as being comparatively labor intensive since the computer 17 upon which the software comprising the customer order subsystem 20 does not require an open modem connection 13, it is not vulnerable to undesired intrusion such that there is no need to separate the production subsystem 21 from customer order subsystem 20.

Figure 5:
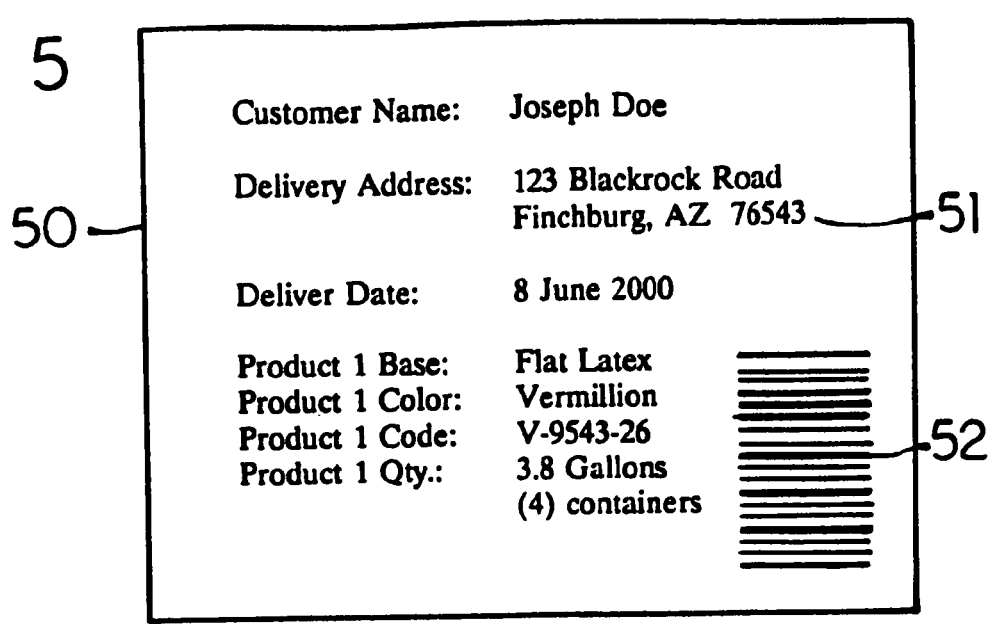
FIG. 5 represents an exemplary label that can be attached to a container holding liquid coating product ordered directly from a remote supplier by a consumer bearing information identifying the contents and other customer order information according to one exemplary embodiment of the invention.

FIG. 5 depicts a label 50 bearing customer order information 51 which is preferably, as shown, inclusive of customer name, delivery address, delivery date, identification of liquid coating base 24 and colorant 25, and both volume (quantity), and number of containers 23 fulfilling the order. Other information may readily be included such as production date, the number of different containerized liquid coating products 36 comprising the order, the volume and number of containers 23 for the same, et cetera. A bar or other digital code 52 is also suggested which is readily read by a scanner 37 for verification of customer order information or retrieval of the same. Use of only a bar or other digital code 37 without textual printing of any customer order information 51 is not particularly recommended though it is certainly considered feasible, particularly if the service utilized for transport 30 is equipped with system which can readily scan and read the customer name and delivery address.

Various embodiments include variable quantity containers. Generally, a variable quantity container relates to and includes a container wherein the volume of the container can be varied so as to minimize (or at least reduce) the amount of air in the container when the container is not completely filled with a liquid coating. Accordingly, the volume of a variable quantity container is not fixed as is the case with many industry-standard containers, such as five-gallon metal paint cans, etc.

Figure 6:
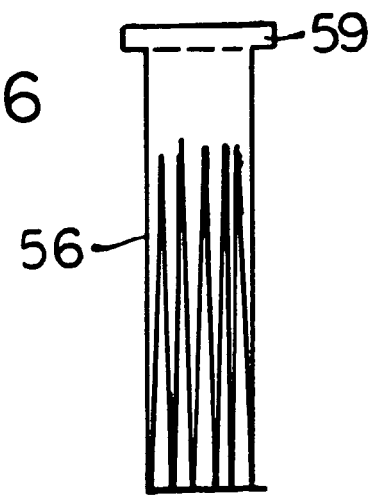
FIG. 6 is a side elevation view of an empty expansible liquid product container molded in plastic according to one exemplary embodiment of the invention.
Figure 7:
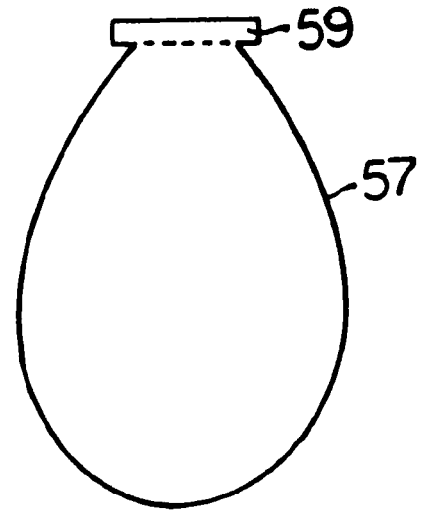
FIG. 7 is a side elevation view of the container shown in FIG. 6 after being filled with a liquid coating product.

By way of example, FIGS. 6 and 7 illustrate an example of a variable quantity container. Specifically, FIG. 6 depicts an empty expansible container 56 in a collapsed condition. FIG. 7 shows a full expansible container 57 that has been filled with liquid coating base 24 and colorant 25 during production of containerized liquid coating product 36. In one embodiment, an expansible container 56, 57 preferably has liquid coating base 24 dispensed from a tank with the use of a mechanism for to support the empty or full expansible container 56, 57. Because colorant 25 is added by the supplier and delivered directly to the consumer 10 and there is no need for reopening the full expansible container 57 after production in the form of containerized liquid product 36, it is considered advantageous economically to utilize expansible containers 56, 57 molded of flexible plastic or film as opposed to conventional rigid metal paint cans or rigid plastic pails for containerization. Especially for smaller volumes it is further considered that an empty expansible container 56 molded of flexible plastic or film may be heat sealed and then shaken in mixing after the addition of colorant 25 in production of the containerized liquid coating product 36. The variable quantity flexible containers may have re-closable features such as a flange zipper.

Figure 13:
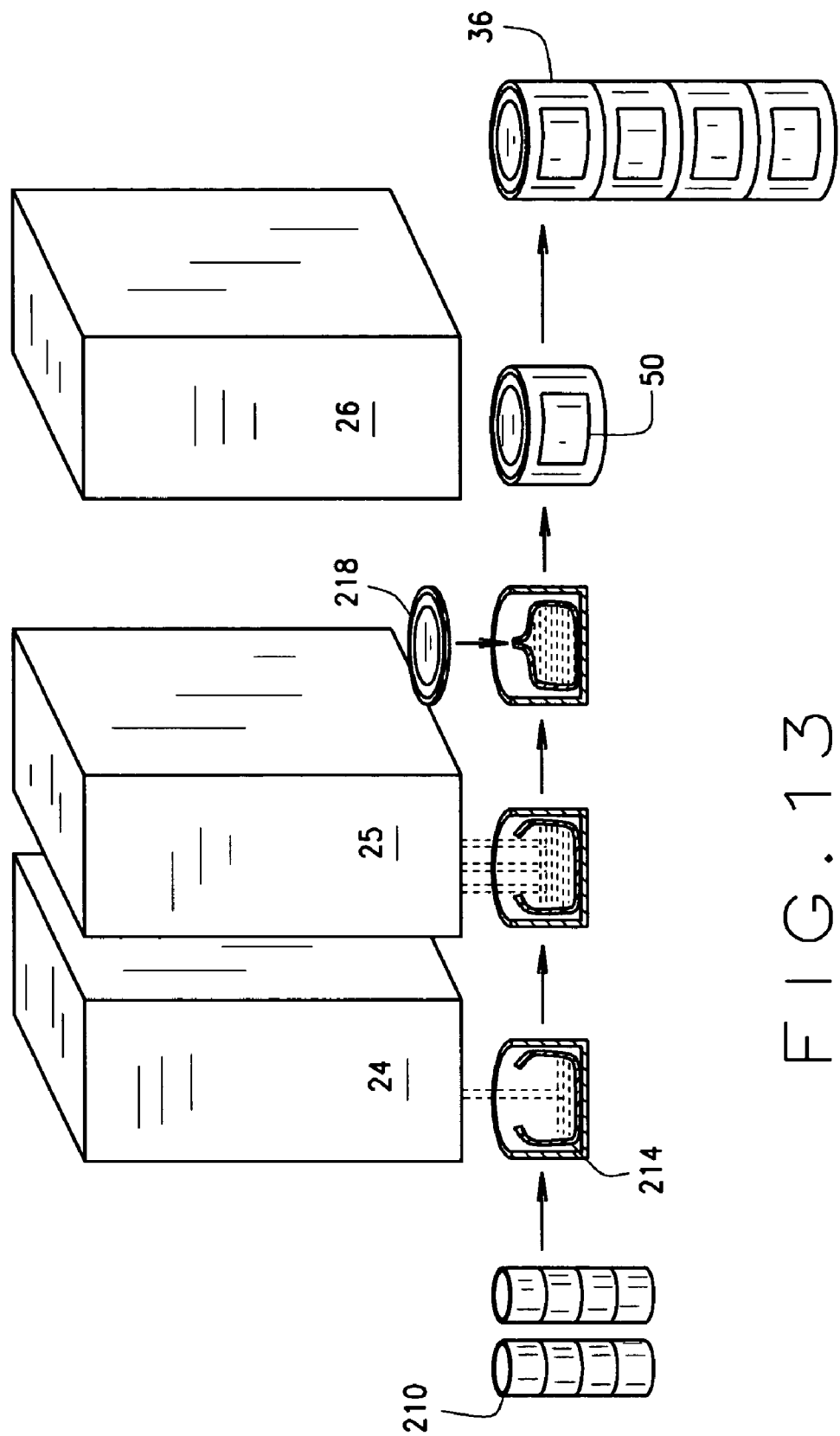
FIG. 13 is a schematic representation of an exemplary liquid coating product supply system according to one exemplary embodiment of the invention utilizing variable quantity containers.

Other embodiments include other types of variable quantity containers. For example, FIG. 13 illustrates a liquid coating product supply system according to one exemplary embodiment of the invention utilizing variable quantity containers. As shown in FIG. 13, the variable quantity containers comprise rigid outer containers 210 (e.g., metal cans, etc.) having flexible inner liners 214 (e.g., plastic bags, etc.). The inner liners 214 can be sealed at variable levels with heat or other crimping technology. After the inner liner has been partially or completely filled and then sealed, a lid 218 can be placed on the outer container 210.

Additional embodiments include variable quantity containers that are bags with spouts at about the bottom, which, in turn, may be positioned in a more rigid container (e.g., cardboard box, can, etc.). In further embodiments, the variable quantity containers are semi-rigid plastic bags that possess sufficient rigidity such that they do not need to be placed in an outer container. Still yet other embodiments use one or more of the containers described in U.S. Pat. No. 6,484,897, U.S. Pat. No. 6,260,730, and/or U.S. Pat. No. 4,258,862.

Generally, U.S. Pat. No. 6,260,730 describes an interchangeable liner for a paint container. The interchangeable liner includes a mouth and a basin portion proportioned for conformal engagement with a solid segment of an interior volume of the paint container. The liner also includes an outer attachment ring defining a lip proportioned for snap-fittable engagement onto a circumferential lip of the paint container. In various embodiments of the present invention, the interchangeable liner may be used with the paint container in order to reduce the volume of the paint container such as when a customer wants less paint than that of the total volume of the paint container.

Figure 14:
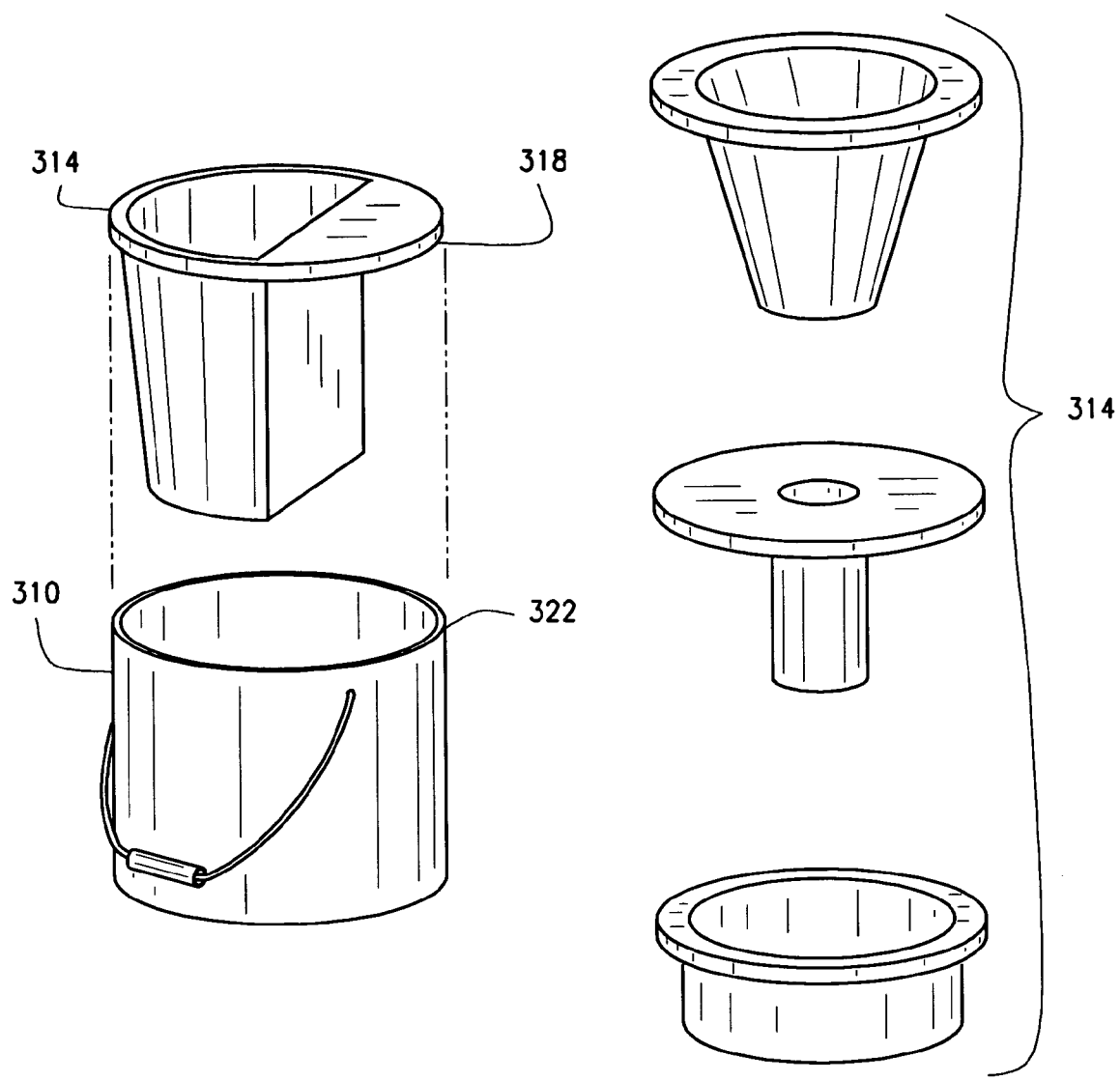
FIG. 14 is a perspective view of an exemplary variable quantity container that may be used in a liquid coating product supply system according to one exemplary embodiment of the invention.

In addition, various embodiments of this invention include using a plurality of interchangeable liners that have different sized interior volumes, thereby providing even further volume adjustability. For example, FIG. 14 illustrates a plurality of exemplary interchangeable liners 314. The liners 314 define a lip 318 proportioned for snap-fittable engagement onto a circumferential lip 322 of the container 310. The particular liner 314 that is used with the container 310 will depend on the amount requested by the customer. Accordingly, the volume of the container can be selectively adjusted by choosing from amongst the various liners 314.

Figures 15, 16:
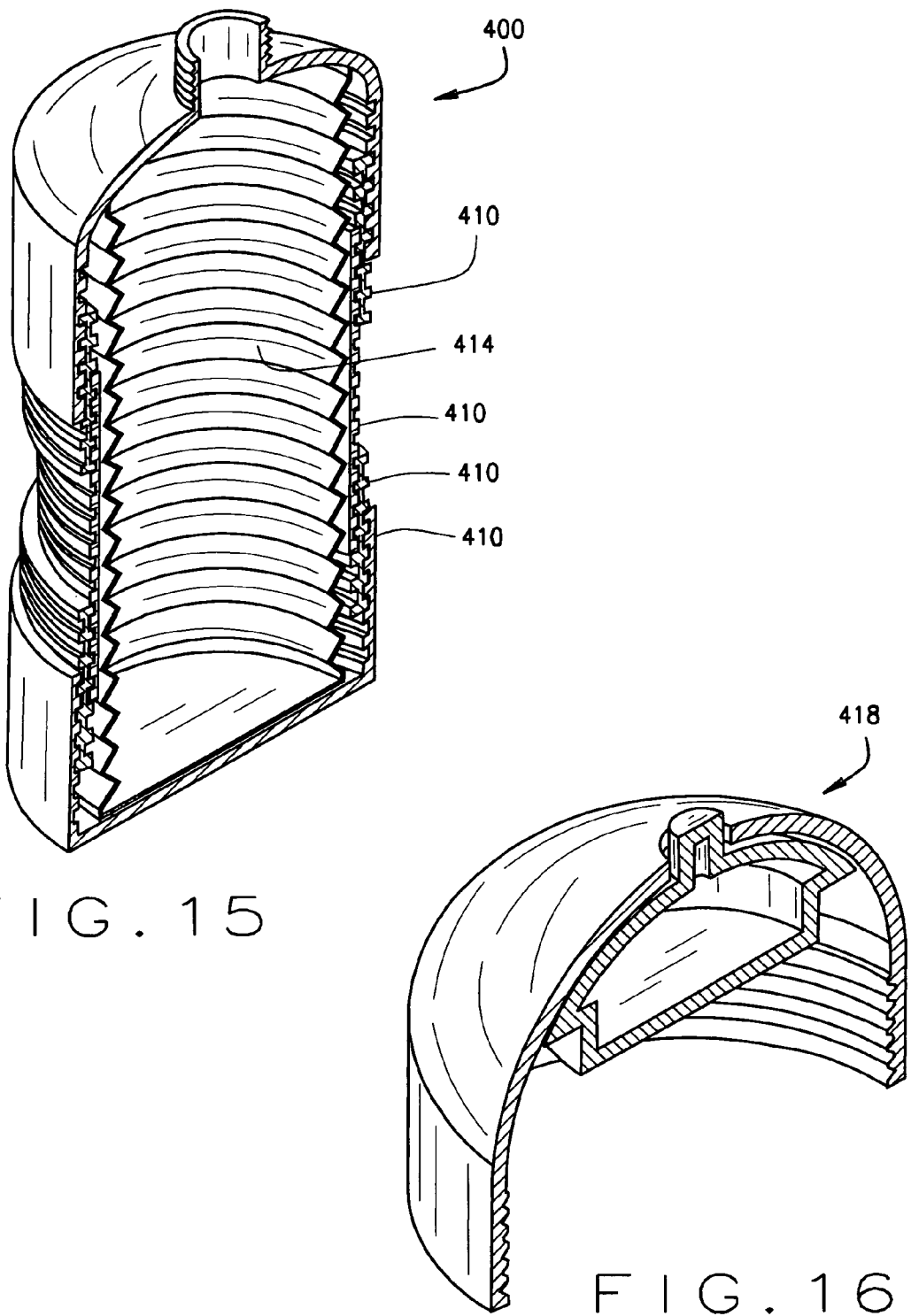
FIG. 15 is a cutaway perspective view of an exemplary variable quantity container that may be used in a liquid coating product supply system according to one exemplary embodiment of the invention.
FIG. 16 is a cutaway perspective view of an exemplary cap that may be used with the variable quantity container shown in FIG. 15.

FIG. 15 illustrates an exemplary variable quantity container 400 that may also be used in a liquid coating product supply system according to one exemplary embodiment of the invention. As shown in FIG. 15, the variable quantity container 400 includes an inner flexible member 414 substantially enclosed in a number of interlocking outer sleeves 410. The volume of the container 400 can be varied by moving at least one outer sleeve relative to another outer sleeve. The outer sleeves can be moved to vary the volume of the container by rotating screw-threaded outer sleeves. Alternatively, the outer sleeves can be moved relative to another by a ratchet, or by using a multi-level bayonet type connection as described in U.S. Pat. No. 6,484,897. FIG. 16 illustrates a cap 418, which is also described in more detail in U.S. Pat. No. 6,484,997.

Yet another exemplary embodiment of this invention includes variable quantity containers that are similar in construction to a caulk tube compatible for use with a piston-type caulking gun. Alternatively, other types of containers can be used as aspects of this invention are not limited to any particular type or kind of container.

As described herein, various aspects of the invention provides methods and systems for the customization of orders for liquid coatings directly by a customer (commercial or non-commercial) from any Internet capable computer. This customization information is used to produce, ship and bill this customized order directly to the customer site. Implementation of an embodiment of the invention virtually eliminates (or at least reduces) the need to maintain an inventory of finished goods and minimizes (or at least reduces) inventory of raw materials.

Figure 8:
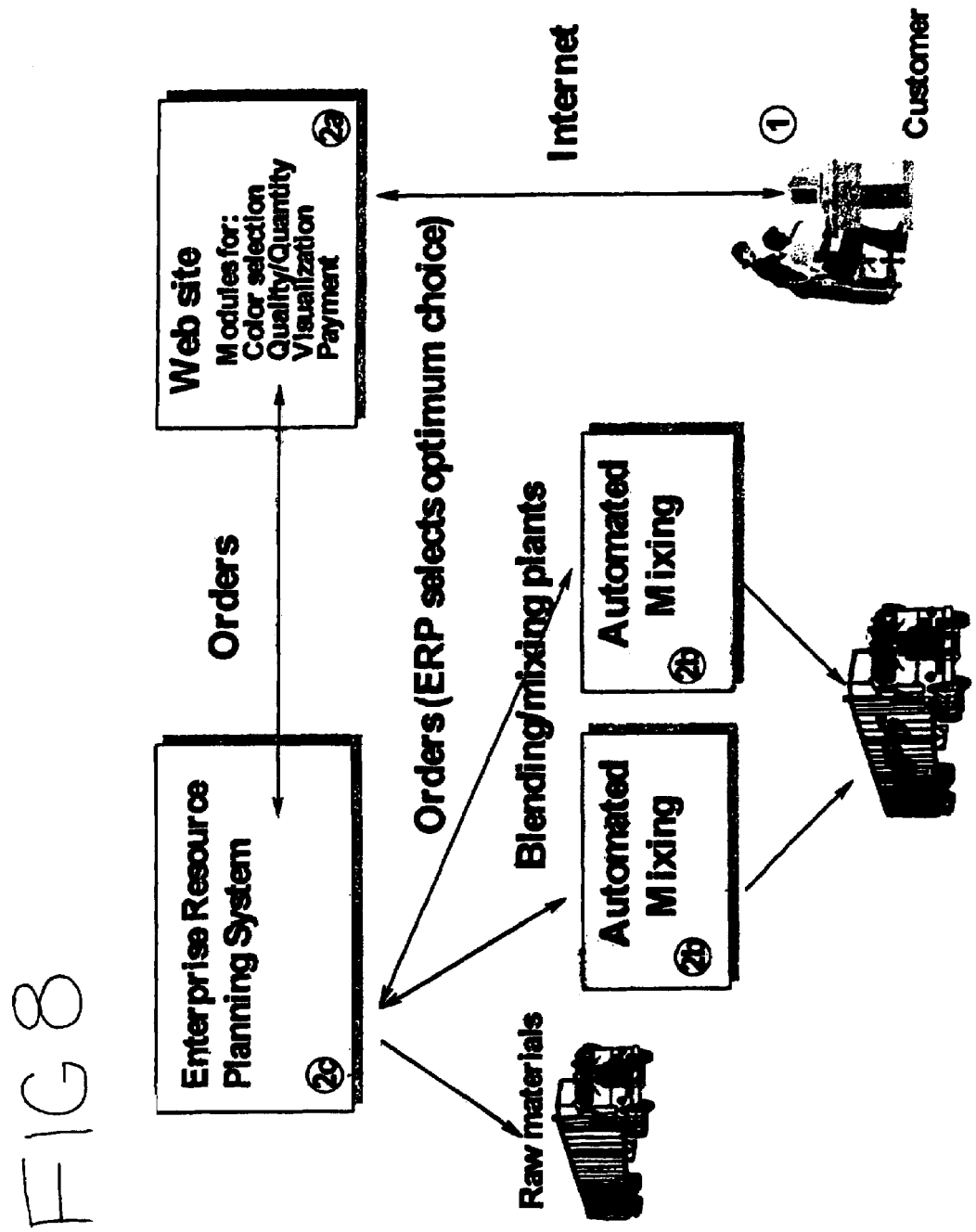
FIG. 8 is a process flow diagram of a method according to one exemplary embodiment of the invention.

FIGS. 8 through 11 illustrate various other aspects of the invention according to another embodiment of the invention. As shown in FIG. 8, a computer user or customer 1 accesses a web site 2a and via the Internet, for example, through a dial-up connection or a direct link such as a cable modem or DSL, and a Java™ enabled browser such as (but not limited to) Internet Explorer or Netscape Navigator, are able to order paint or other liquid coating products. Various embodiments can include downloading browser plug-ins or software for virtual reality modeling, such as graphic representation of a room, lighting source manipulations, and the ability to digitally load a room's furnishings.

The customer 1 through an efficient real-time interactive process creates an order, pays for the order, and directs where the liquid coating products are to be delivered. Essential selling and performance information is available interactively for the consumer to utilize.

In various embodiments, the consumer will be able to directly select a color-based on commercially available color systems such as but not limited to Pantone™. The consumer will be allowed to enter a Pantone™ "number" or to match a color chip using a monitor. An alternate method can include picking of colors interactively, such as using a monitor calibration sequence. Monitor calibration software is currently supplied by several vendors. Other embodiments might include input from a spectrophotometer.

An efficient model can be used to assist the customer to determine the quality and quantity of paint and related materials needed for her/his job, including virtual reality models that allow the customer to upload data about a project. The data could be as simple as room dimensions, or the data could be more complex such as three-dimensional models including furniture and furniture colors, patterns, blinds and textures along with lighting. The virtual reality models can be previewed by the customer to see what the coatings would look like in the customer's environment.

In various embodiments, customers will enter personal information such as name, address, telephone, credit card information and delivery information using a secure channel via the Internet. This can be accomplished using standard web browser capability such as the SSL protocol. Payment option variations include but are not limited to digital cash or other standard encryption protocols. Customers can also be offered the option of receiving samples of their order prior to shipment of the actual order. This feature will allow the user to have complete confidence that they are getting the color materials they need.

Figure 11:
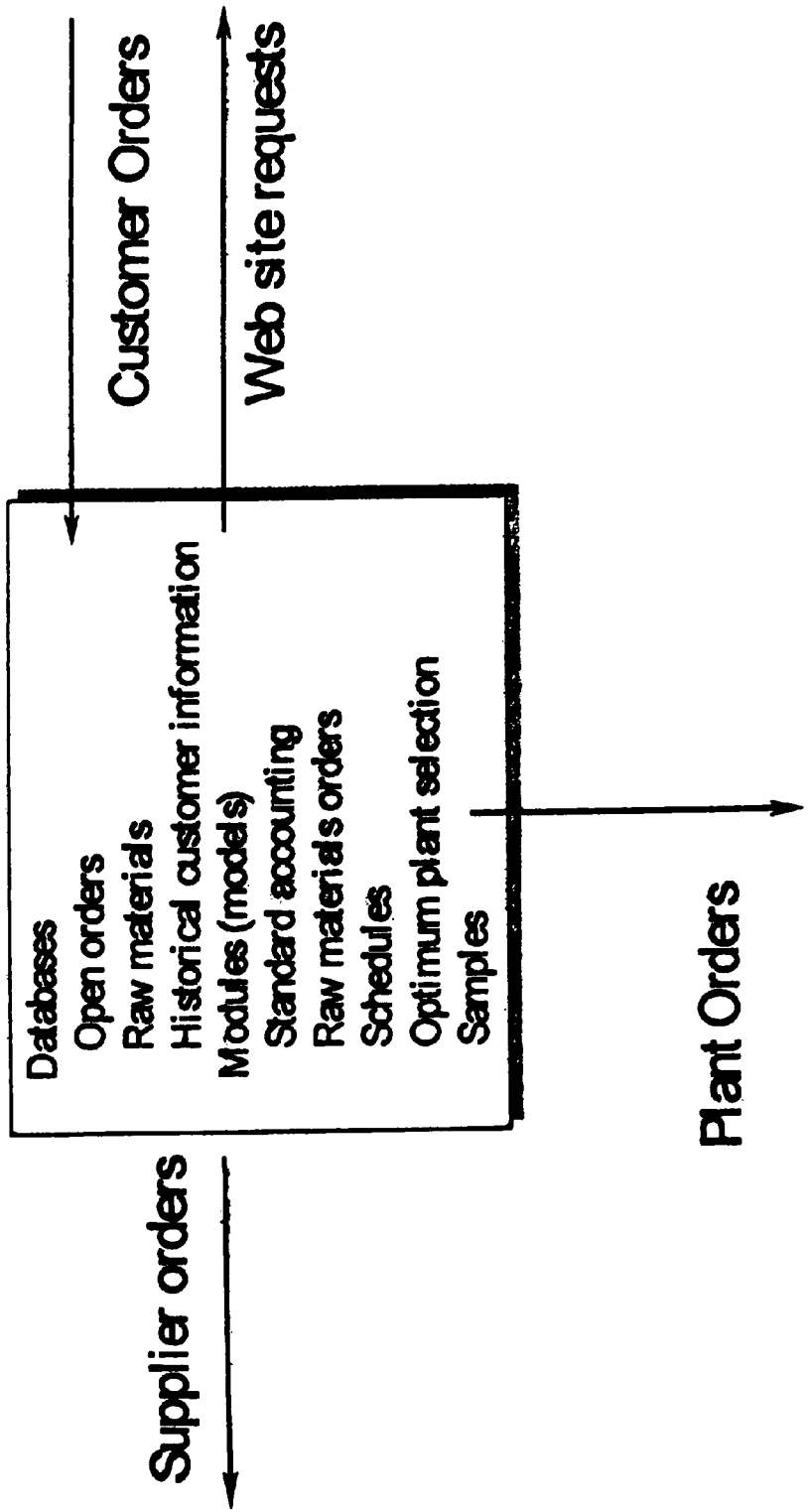
FIG. 11 is representation of an enterprise resource planning system that may be used in the method shown in FIG. 8.

In various embodiments, the completed order and relevant information can be entered into a enterprise resource planning (ERP) database 2c (FIGS. 8 and 11). Transactions with the ERP system are via the Internet. The ERP system resides on a computer that may be virtually anywhere. The order is posted to the pending job queue for the plant with the minimum transportation cost to the customer delivery site.

Each plant can have a pending job queue on the ERP system. New jobs are automatically transmitted to the best choice automated mixing system (e.g., 2b or 2b in FIGS. 8 and 10) in that plant. Load is balanced between mixing systems in a plant. Once a job has been assigned to one or more machines, the machines produce the customers order. The mixing systems are capable of packaging customer orders in sizes of containers from sample size up to fifty-five gallon drums.

Passive or active electronic labels are affixed to the customer order. The labels are readable by both the plant systems and the delivery company systems.

Orders are loaded into commercial delivery company trailers and the ERP systems are apprised of the completed order. The trailers are picked up on regular schedules by commercial delivery services for delivery to the customer site(s).

As shown in FIG. 8, the exemplary process links disparate technologies into a new paradigm for delivery of a liquid coating product. This, in turn, can provide significant efficiency over traditional methods of manufacturing and selling liquid coatings, such as the existing methods for selling paint require substantial inventories of finished goods.

Figure 9:
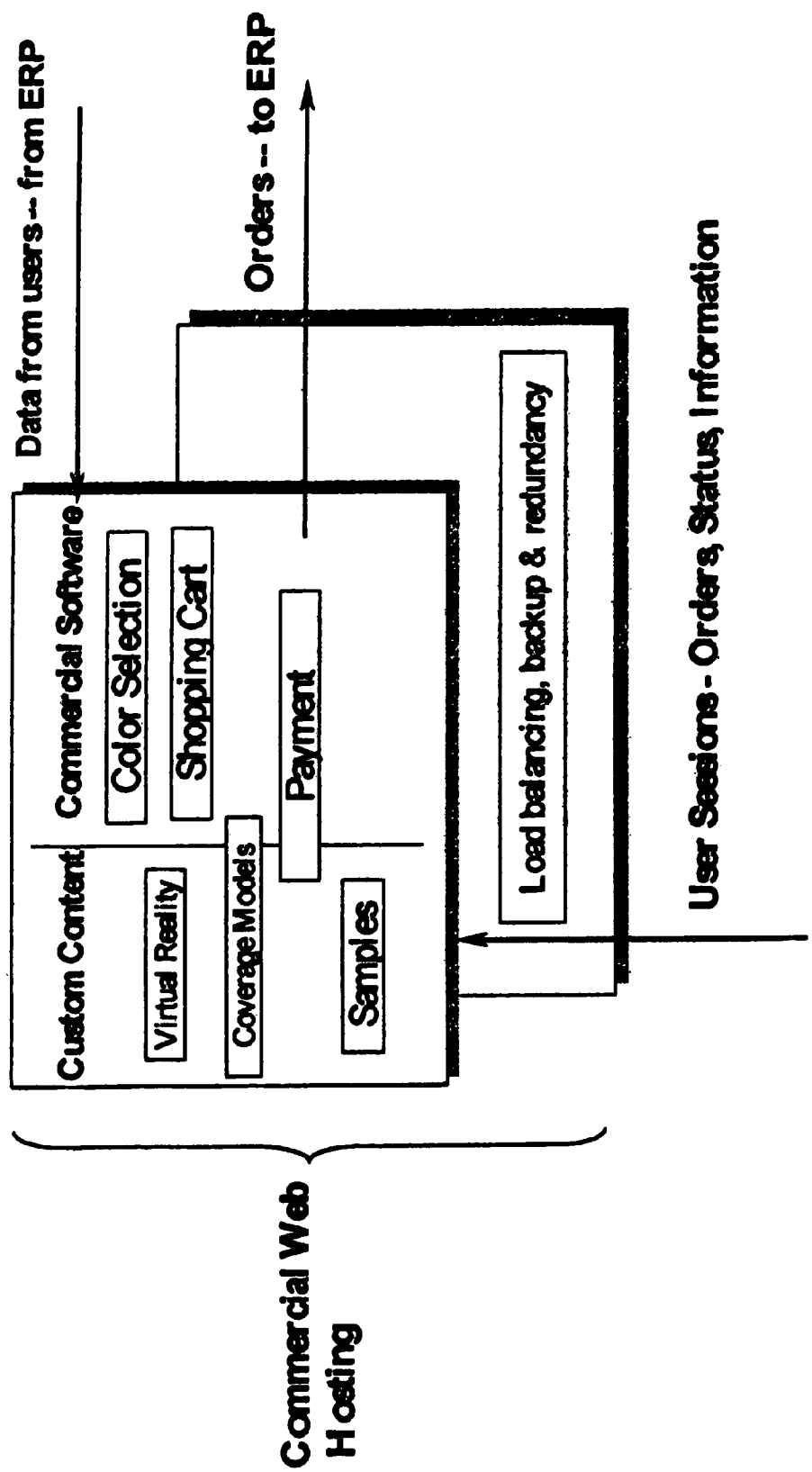
FIG. 9 is a representation of an exemplary web site that may be used in the method shown in FIG. 8.

FIG. 9 illustrates an exemplary web site that can be used in the method shown in FIG. 8. As shown in FIG. 9, the web site includes a number of computers with substantial redundancy to allow virtually uninterrupted access for customers. The computers can be operated by a contractor on premises owned by the contractor, but could also be operated by the manufacturer. It is generally preferable that the contractor have multiple physical sites widely separated geographically. Load (sessions with users) will be automatically balanced across sites. The web site may have many capabilities, but in various embodiments is capable of helping a customer select colors, quantity, quality, and process the order including payment. In such embodiments, the web site includes a module for color selection (which may be Java-based). The web site also includes a quantity module, which may be a model based on algorithms for paint coverage under various constraints, e.g., dimensions of rooms, surface condition, surface material, interior versus exterior, time of year, relative humidity, paint quality, etc. The web site further includes a quality module to allow the user to select various qualities of paint from several different manufacturers. Payment will typically be via credit card but other payments options can also be made available.

Figure 10:
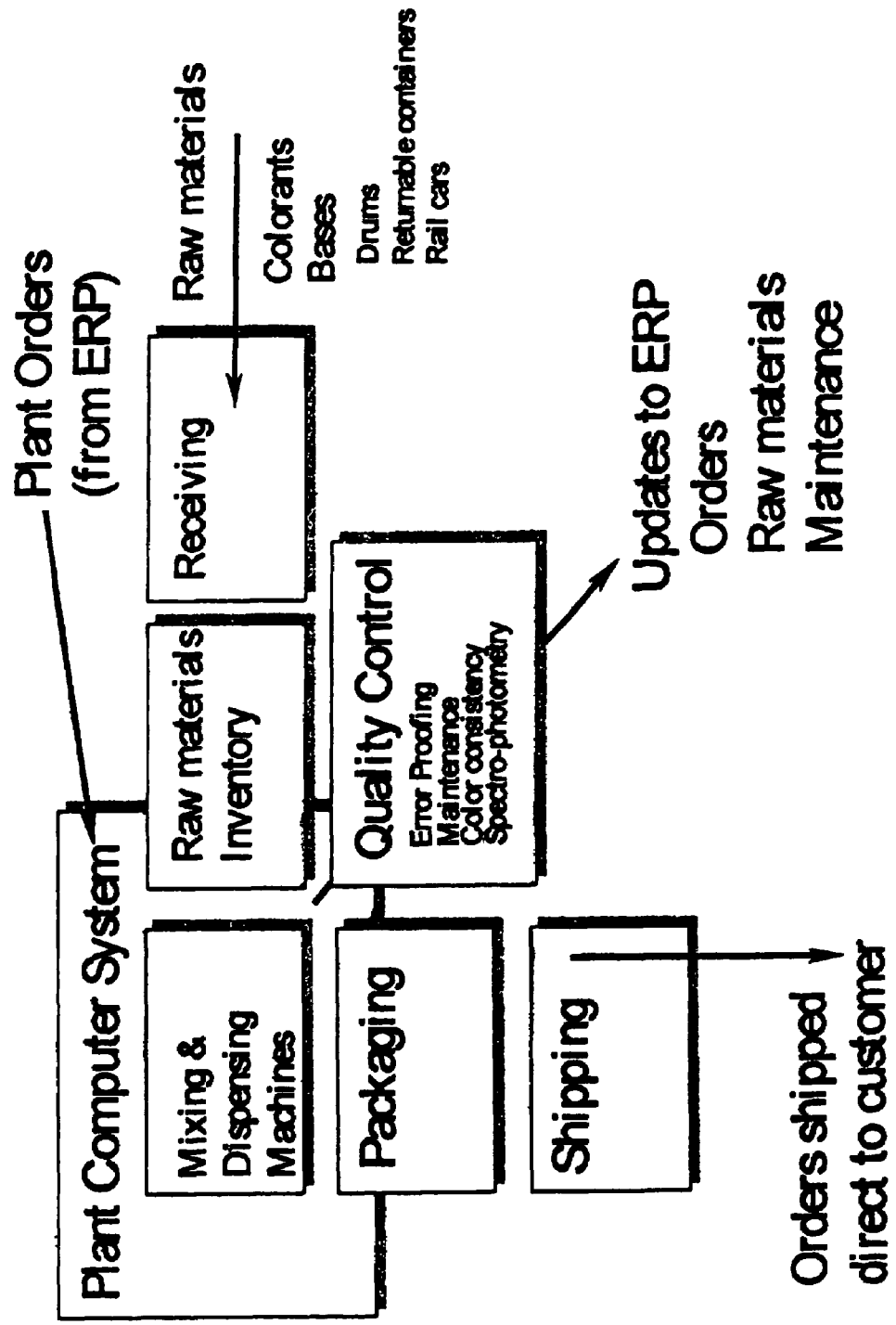
FIG. 10 is a representation of an exemplary manufacturing site that may be used in the method shown in FIG. 8.

One possible manufacturing site is shown in FIG. 10. As shown, the manufacturing site will mix bases such as, but not limited to, eggshell, satin, semi-gloss, gloss, etc. (most likely from bulk storage vessels) with colorants. The manufacturing site can be located to optimize transportation costs both of inbound raw materials and outbound finished product. Minimizing the outbound transportation costs is an important factor in determining the number and location of each mixing plant. In one embodiment, plant locations can be conveniently located near regional distribution hubs of companies such as United Parcel Service, etc.

Each plant location can include one or more automated dispensing and mixing systems, such as commercially available systems that are under computer control. Typically, dispensing and mixing machines can accommodate both water and solvent-based fluids with large variation in viscosity. Some can accept base in two hundred liter drums or direct connection to one thousand liter returnable containers or bulk storage systems. Dispensing systems can incorporate a wide number of dispensing valves depending on the specific need.

Once an order is produced, it can be moved to an automated packaging system that labels all products with customer delivery information. Orders can be automatically packaged for shipment by commercial carrier into containers that meet all requirements of the carrier for weight and size limits. This varies from carrier to carrier and with class of shipment, e.g., UPS hundred weight class.

FIG. 11 shows an exemplary enterprise resource planning (ERP) system. As shown, the ERP system controls business processes. The ERP system may reside on a different computer than the web site. Regardless of where it resides, however, the ERP system can be connected to the web site and to each plant location via the Internet. The ERP system can contain a variety of databases, such as customer orders, historical customer information, supplier information, raw material orders, etc. The code to drive the operation of the system can combine standard ERP functions along with custom modules for scheduling and optimizing where to send customer orders and when to order raw materials.

Accordingly, various embodiments of the present invention enable consumers to purchase liquid coatings via the Internet (or through other suitable means) and have the liquid coatings shipped directly to their home or work site without requiring a trip to a local retailer. Various embodiments can enable manufacturers to customize orders for each individual customer thereby significantly reducing finished goods inventory. Various embodiments can also provide one or more of the following benefits, including but not limited to: manufacturing and selling of liquid coatings where large reductions in raw materials and finished goods inventory will be realized; more efficient distribution channel for the raw material producer and the consumer; new services and/or offerings, such as paint usage calculations, primer selection-based on substrate requirements (drywall, bare and or rough sawed wood, polymers, etc.); and direct to customer distribution channel eliminates the need for the local retailer. Implementing one or more of the various embodiments of the present invention can modify existing distribution channels for the liquid coating industry thereby eliminating virtually all (or at least reducing) finished goods inventory; can integrate a web site for interacting with customers to create individualized orders that schedule automated dispensing machinery in remote locations; can efficiently convert factory-sized lots from (raw materials) one gallon, to fifty-five gallon, to rail cars into customer-sized lots from samples to fifty-five gallons; can link at the point of sale (e.g., online) essential performance and selling information such as primer selection-based on substrate characteristics (e.g., bare drywall, uncoated wood, etc.), color selection; and/or can enable a liquid coatings registry where a customer could request a paint color that was purchased earlier.

The teachings of the present invention can be applied in a wide range of liquid coatings, including paint, fingernail polish, liquid makeup, lipstick, hair dyes, inks, among others. Accordingly, the specific references to paint herein should not be construed as limiting the invention to any specific kind or type of liquid coating.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method comprising:
electronically receiving an order for a liquid coating over a computer network, the order including a plurality of inputs relating to a delivery address and a customer-specified color and a customer-specified quantity of liquid coating,
controllably manufacturing in a single batch and containerizing the liquid coating having the customer-specified color and customer-specified produced-to-order quantity in accordance with the plurality of inputs, and
causing delivery of the containerized liquid coating having the customer-specified color and customer-specified produced-to-order quantity to the delivery address in accordance with the plurality of inputs,
wherein the volume of the containerized liquid coating is containerized in an expansible variable quantity container that is configured to be expansible so as to satisfy the customer-specified quantity of liquid coating, and is sufficiently rigid such that the variable quantity container does not need to be placed in a metal can.

2. The method of claim 1, wherein containerizing includes only partially filling an expansible variable quantity container to less than the expansible variable quantity container's full expansible volume, wherein the volume of the expansible variable quantity container can be varied so as to minimize the amount of air in the expansible variable quantity container when it is not completely filled with a liquid coating.

3. The method of claim 2, further comprising pricing the fractionally filled container in accordance with the fractional quantity within the fractionally filled container.

4. The method of claim 1, wherein containerizing includes containerizing liquid coating in a container having a capacity that is a fractional portion or an uneven multiple of gallons, quarts, pints, and liters.

5. The method of claim 4, further comprising pricing the container in accordance with the capacity of the container.

6. The method of claim 1, wherein controllably manufacturing includes producing in a single batch a customer-specified quantity of liquid coating that is a fractional portion or an uneven multiples of gallons, quarts, pints, and liters.

7. The method of claim 1, wherein controllably manufacturing includes producing in a single batch a customer-specified quantity of liquid coating that is an even multiple of at least one of gallons, quarts, pints, and liters.

8. The method of claim 1, wherein containerizing includes filling an expansible variable quantity container that is in a collapsed condition, and is expanded when filled with liquid coating.

9. The method of claim 8, wherein containerizing includes filling the variable quantity container with a quantity as specified by the customer.

10. The method of claim 8, wherein containerizing includes filling the variable quantity container with a quantity as determined by an algorithm.

11. The method of claim 1, wherein the computer network comprises the Internet.

12. The method of claim 1, wherein the method includes allowing a customer to access an Internet website to input to an order for a liquid coating, the Internet web site capable of providing assistance in the selection of a liquid coating appropriate to a given job as defined by information input by the customer.

13. The method of claim 1, wherein the customer-specified color is inputted using a handheld spectrophotometer.

14. The method of claim 1, wherein the liquid coatings are at least one of sold and purchased by at least one or more industries as defined by the Standard Industrial Classification (SIC Code) with a date of publication 1987.

15. The method of claim 1, wherein at least one color-enhancing ingredient is added to the liquid coating.

16. The method of claim 1, wherein at least one performance-enhancing ingredient is added to the liquid coating.

17. A method comprising:
electronically receiving an order for a liquid coating over a computer network, the order including a plurality of inputs relating to a delivery address and a customer-specified color and a customer-specified quantity of liquid coating,
making in a single batch a customer-specified quantity of liquid coating that is a fractional portion or an uneven multiple of gallons, quarts, pints, and liters in any customizable color with the addition of colorant to liquid coating base in precision quantities, the making including fractionally filling an expansible variable quantity container with a liquid coating base corresponding to the customer-specified color and customer-specified quantity of liquid coating, and adding colorant for color customization to the liquid coating base in a precise amount corresponding to the customer-specified color and customer-specified quantity, wherein the volume of the containerized liquid coating is contained in an expansible variable quantity container that is expansible so as to satisfy the customer-specified quantity of liquid coating, where the expansible variable quantity container is sufficiently rigid such that the expansible variable quantity container does not need to be placed within a metal can, and
causing delivery of the containerized liquid coating having the customer-specified color and customer-specified quantity to the delivery address in accordance with the plurality of inputs.

18. A system enabling production of customized produced-to-order containerized liquid coatings, the system comprising:
a computing device having an electronic interface, coupled to a computer network, for allowing a customer to place an order for a liquid coating in accordance with inputs of a customer-specified color and a customer-specified quantity of liquid coating,
a customer order subsystem for receiving the order over the computer network, a production subsystem for compiling information associated with the order and processing the results of the compilation to yield production parameters, and
a production line capable of producing in a single batch a liquid coating having the customer-specified color and the customer-specified quantity, and filling an expansible variable quantity container with the liquid coating, wherein the expansible variable quantity container is configured to be expansible so as to satisfy the customer-specified quantity requirement, and is sufficiently rigid such that the expansible variable quantity container does not need to be placed in a metal can, the production line operable in accordance with the production parameters to produce in a single batch the liquid coating having the customer-specified color and customer-specified quantity in accordance with the order placed by the customer.

19. The system of claim 18, wherein the production line is capable of fractionally filling an expansible variable quantity container to less than the expansible variable quantity container's full expansible volume, wherein the volume of the expansible variable quantity container can be varied so as to minimize the amount of air in the expansible variable quantity container when it is not completely filled with a liquid coating.

20. The system of claim 18, wherein the production line is capable of containerizing liquid coating in a container having a capacity that is a fractional portion or an uneven multiple of gallons, quarts, pints, and liters.

21. The system of claim 18, wherein the computing device having an electronic interface includes a web site that provides assistance in the selection of liquid coating appropriate to a given job as defined by information input by the customer through the electronic interface.

22. The system of claim 21, wherein the assistance in the selection of liquid coating includes identification of a custom color, recommendation of a liquid coating base, and calculation of an appropriate volume for the given job.

23. The system of claim 21, wherein the assistance in the selection of liquid coating includes suggestion of at least one custom color-based upon digital input by the customer including at least one of digital video input, digital photograph input, and digital solid modeling input.

24. The method of claim 17, wherein making includes filling an expansible variable quantity container that is in a collapsed condition and expands when filled with liquid coating.

* * * * *